Patented Apr. 16, 1929.

1,709,819

UNITED STATES PATENT OFFICE.

WILLIAM BREITZKE, OF DETROIT, MICHIGAN.

POLISHING COMPOSITION.

No Drawing. Application filed January 31, 1927. Serial No. 165,040.

This invention relates to polishing materials particularly adaptable to glass but applicable also to any polished surface, as furniture, polished metal, and the like. Polish as heretofore provided for promoting a brilliant polish is usually of a transitory nature and requires frequent applications in order to preserve good luster. A characteristic feature of my composition is that the luster lasts for a long time, a number of weeks in fact, preserving its original luster and therefore not requiring frequent application. Moreover, my composition is much cheaper to prepare than any of those now commercially available.

My composition is prepared with a plurality of fruit juices, preferably including orange and lemon, in substantially the same relative proportions and a similar proportion of pineapple juice and banana juice, diluting them with about three times their volume of water, acidifying slightly with 1.5% hydroloric acid, adding 2¼% of borax, 1.25% of sulphuric ether, and forming the mass into a paste and inclosing it in a closely capped casing or carton for the market. I have discovered that it is desirable from an efficiency standpoint to employ the fruit I use in the preparation in a partly decomposed condition. The fermentation resulting from such decayed fruit releases partly alcholic, or at least acidified, or both conditions as oxidation products, which render more effective a brilliant polish produced when applied with a soft cloth to a glass or other bright surface.

The several juices, and especially the banana juice, on exposure to air form a resistant film which preserves the gloss for many weeks, thus appealing to housewives strongly in keeping their windows clean at little expense of a low priced product which lasts for a very long time.

In preparing my composition during the initial development of my invention, I used prime fruit, but discovered by accident that when partly decayed the fruit ingredients not only did not interfere with the glossy permanence of the luster, but actually improved it in the respect of durability, which has proved of material advantage in permitting the composition to be prepared at fractional expense to what would have been necessary if prime fruit had been called for.

I have given certain relative proportions to the ingredients, but would have it understood that these are not of invariable relative proportion nor is it absolutely essential that all of the fruit juices recited be employed, I believe the banana juice and some form of citrate to be necessary to blend with the mineral acid, borax and ether.

What I claim is:

A polishing composition consisting of the reaction products of a dilute mixture of the juices of partly decayed oranges, lemons, pineapples, and bananas with two and one-quarter per cent of borax, one and five-tenths per cent of hydrochloric acid, and one and one-quarter per cent of sulphuric ether.

In testimony whereof I affix my signature.

WILLIAM BREITZKE.